United States Patent [19]

Tai

[11] Patent Number: 5,204,753
[45] Date of Patent: Apr. 20, 1993

[54] MULTI-BIT RENDERING METHOD AND ARRANGEMENT FOR CONTINUOUS TONE PICTURE REPRESENTATION AND PRINTING

[75] Inventor: Hwai-Tzuu Tai, Rochester, N.Y.

[73] Assignee: Eastman Kodak Company, Rochester, N.Y.

[21] Appl. No.: 895,985

[22] Filed: Jun. 5, 1992

[51] Int. Cl.$^5$ .............................................. H04N 1/23
[52] U.S. Cl. ..................... 358/298; 358/455; 358/457; 358/458; 358/459; 358/462; 358/466
[58] Field of Search ............... 358/300, 296, 298, 455, 358/456, 457, 458, 459, 462, 465, 466; 346/160; 382/50

[56] References Cited

U.S. PATENT DOCUMENTS

| | | | |
|---|---|---|---|
| 4,736,254 | 4/1988 | Kotera | 358/298 |
| 5,075,780 | 12/1991 | Shibahara | 358/298 |
| 5,130,821 | 7/1992 | Ng | 358/458 |

Primary Examiner—Benjamin R. Fuller
Assistant Examiner—Scott A. Rogers
Attorney, Agent, or Firm—Norman Rushefsky

[57] ABSTRACT

A method and arrangement for reproducing an original image, scans and digitizes an original image into pixels of a digitized image. A dot template, a bit-depth, and a dot type structure are selected. A set of gray dot patterns are generated from the dot template, pixel bit-depth and dot type structure that are selected. A 4-quadrant tone reproduction on the set of gray dot patterns is then performed to produce a set of thresholding values at each pixel of the digitized image. A first signal corresponding to a gray level halftoned representation of the digitized image using the thresholding values is then produced. From the first signal, a gray level halftoned reproduction of the original image is printed.

10 Claims, 14 Drawing Sheets

LEVEL 1

| 43 | 36 | 22 | 8 |
|----|----|----|----|
| 15 | ① | 29 | 50 |
| 22 | 8  | 43 | 36 |
| 29 | 50 | 15 | 1 |

30 points to LEVEL 1.

LEVEL 2

| 44 | 37 | 23 | 9 |
|----|----|----|----|
| 16 | 2  | 30 | 51 |
| 23 | 9  | 44 | 37 |
| 30 | 51 | 16 | 2 |

LEVEL 3

| 45 | 38 | 24 | 10 |
|----|----|----|----|
| 17 | 3  | 31 | 52 |
| 24 | 10 | 45 | 38 |
| 31 | 52 | 17 | 3 |

LEVEL 4

| 46 | 39 | 25 | 11 |
|----|----|----|----|
| 18 | 4  | 32 | 53 |
| 25 | 11 | 46 | 39 |
| 32 | 53 | 18 | 4 |

LEVEL 5

| 47 | 40 | 26 | 12 |
|----|----|----|----|
| 19 | 5  | 33 | 54 |
| 26 | 12 | 47 | 40 |
| 33 | 54 | 19 | 5 |

LEVEL 6

| 48 | 41 | 27 | 13 |
|----|----|----|----|
| 20 | 6  | 34 | 55 |
| 27 | 13 | 48 | 41 |
| 34 | 55 | 20 | 6 |

LEVEL 7

| 49 | 42 | 28 | 14 |
|----|----|----|----|
| 21 | 7  | 35 | 56 |
| 28 | 14 | 49 | 42 |
| 35 | 56 | 21 | 7 |

```
      34
         LEVEL 1
   7    6    4    2
   3   ①    5    8
   4    2    7    6
   5    8    3    1

LEVEL 2
  15   14   12   10
  11    9   13   16
  12   10   15   14
  13   16   11    9

LEVEL 3
  23   22   20   18
  19   17   21   24
  20   18   23   22
  21   24   19   17

LEVEL 4
  31   30   28   26
  27   25   29   32
  28   26   31   30
  29   32   27   25
```

```
         LEVEL 5
  39   38   36   34
  35   33   37   40
  36   34   39   38
  37   40   35   33

LEVEL 6
  47   46   44   42
  43   41   45   48
  44   42   47   46
  45   48   43   41

LEVEL 7
  55   54   52   50
  51   49   53   56
  52   50   55   54
  53   56   51   49
```

FIG. 6

| LEVEL 1 | | | | LEVEL 5 | | | |
|---|---|---|---|---|---|---|---|
| 31 | 26 | 16 | 6 | 35 | 30 | 20 | 10 |
| 11 | ① | 21 | 36 | 15 | 5 | 25 | 40 |
| 16 | 6 | 31 | 26 | 20 | 10 | 35 | 30 |
| 21 | 36 | 11 | 1 | 25 | 40 | 15 | 5 |

| LEVEL 2 | | | | LEVEL 6 | | | |
|---|---|---|---|---|---|---|---|
| 32 | 27 | 17 | 7 | 47 | 46 | 44 | 42 |
| 12 | 2 | 22 | 37 | 43 | 41 | 45 | 48 |
| 17 | 7 | 32 | 27 | 44 | 42 | 47 | 46 |
| 22 | 37 | 12 | 2 | 45 | 48 | 43 | 41 |

| LEVEL 3 | | | | LEVEL 7 | | | |
|---|---|---|---|---|---|---|---|
| 33 | 28 | 18 | 8 | 55 | 54 | 52 | 50 |
| 13 | 3 | 23 | 38 | 51 | 49 | 53 | 56 |
| 18 | 8 | 33 | 28 | 52 | 50 | 55 | 54 |
| 23 | 38 | 13 | 3 | 53 | 56 | 51 | 49 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

| | | | |
|---|---|---|---|
| 15 | 4 | 14 | 2 |

| | | | |
|---|---|---|---|
| 8 | 12 | 6 | 10 |

| | | | |
|---|---|---|---|
| 13 | 1 | 16 | 3 |

| | | | |
|---|---|---|---|
| 5 | 9 | 7 | 11 |

| DOT LEVEL 1 | | | | DOT LEVEL 2 | | | | DOT LEVEL 3 | | | | DOT LEVEL 4 | | | |
|---|---|---|---|---|---|---|---|---|---|---|---|---|---|---|---|
| 5 | 13 | 8 | 15 | 21 | 29 | 24 | 31 | 37 | 45 | 40 | 47 | 53 | 61 | 56 | 63 |
| 9 | 1 | 12 | 4 | 25 | 17 | 28 | 20 | 41 | 33 | 44 | 36 | 57 | 49 | 60 | 52 |
| 7 | 16 | 6 | 14 | 23 | 32 | 22 | 30 | 39 | 48 | 38 | 46 | 55 | 64 | 54 | 62 |
| 11 | 3 | 10 | 2 | 27 | 19 | 26 | 18 | 43 | 35 | 42 | 34 | 59 | 51 | 58 | 50 |

| DOT LEVEL 5 | | | | DOT LEVEL 6 | | | | DOT LEVEL 7 | | | | DOT LEVEL 8 | | | |
|---|---|---|---|---|---|---|---|---|---|---|---|---|---|---|---|
| 69 | 77 | 72 | 79 | 85 | 93 | 88 | 95 | 101 | 109 | 104 | 111 | 117 | 125 | 120 | 127 |
| 73 | 65 | 76 | 68 | 89 | 81 | 92 | 84 | 105 | 97 | 108 | 100 | 121 | 113 | 124 | 116 |
| 71 | 80 | 70 | 78 | 87 | 96 | 86 | 94 | 103 | 112 | 102 | 110 | 119 | 128 | 118 | 126 |
| 75 | 67 | 74 | 66 | 91 | 83 | 90 | 82 | 107 | 99 | 106 | 98 | 123 | 115 | 122 | 114 |

| DOT LEVEL 9 | | | | DOT LEVEL 10 | | | | DOT LEVEL 11 | | | | DOT LEVEL 12 | | | |
|---|---|---|---|---|---|---|---|---|---|---|---|---|---|---|---|
| 133 | 141 | 136 | 143 | 149 | 157 | 152 | 159 | 165 | 173 | 168 | 175 | 181 | 189 | 184 | 191 |
| 137 | 129 | 140 | 132 | 153 | 145 | 156 | 148 | 169 | 161 | 172 | 164 | 185 | 177 | 188 | 180 |
| 135 | 144 | 134 | 142 | 151 | 160 | 150 | 158 | 167 | 176 | 166 | 174 | 183 | 192 | 182 | 190 |
| 139 | 131 | 138 | 130 | 155 | 147 | 154 | 146 | 171 | 163 | 170 | 162 | 187 | 179 | 186 | 178 |

| DOT LEVEL 13 | | | | DOT LEVEL 14 | | | | DOT LEVEL 15 | | | | DOT LEVEL 16 | | | |
|---|---|---|---|---|---|---|---|---|---|---|---|---|---|---|---|
| 197 | 205 | 200 | 207 | 213 | 221 | 216 | 223 | 229 | 237 | 232 | 239 | | | | |
| 201 | 193 | 204 | 196 | 217 | 209 | 220 | 212 | 233 | 225 | 236 | 228 | | | | |
| 199 | 208 | 198 | 206 | 215 | 224 | 214 | 222 | 231 | 240 | 230 | 238 | | | | |
| 203 | 195 | 202 | 194 | 219 | 211 | 218 | 210 | 235 | 227 | 234 | 226 | | | | |

FIG. 10

|  | LEVEL 1 | | | | LEVEL 2 | | | | LEVEL 3 | | | | LEVEL 4 | | |
|---|---|---|---|---|---|---|---|---|---|---|---|---|---|---|---|
| 250 |  | 242 | 247 | 240 | 234 | 226 | 231 | 224 | 218 | 210 | 215 | 208 | 202 | 194 | 199 | 192 |
| 246 |  | 254 | 243 | 251 | 230 | 238 | 227 | 235 | 214 | 222 | 211 | 219 | 198 | 206 | 195 | 203 |
| 248 |  | 239 | 249 | 241 | 232 | 223 | 233 | 225 | 216 | 207 | 217 | 209 | 200 | 191 | 201 | 193 |
| 244 |  | 252 | 245 | 253 | 228 | 236 | 229 | 237 | 212 | 220 | 213 | 221 | 196 | 204 | 197 | 205 |

|  | LEVEL 5 | | | | LEVEL 6 | | | | LEVEL 7 | | | | LEVEL 8 | | |
|---|---|---|---|---|---|---|---|---|---|---|---|---|---|---|---|
| 186 |  | 178 | 183 | 176 | 170 | 162 | 167 | 160 | 154 | 146 | 151 | 144 | 138 | 130 | 135 | 128 |
| 182 |  | 190 | 179 | 187 | 166 | 174 | 163 | 171 | 150 | 158 | 147 | 155 | 134 | 142 | 131 | 139 |
| 184 |  | 175 | 185 | 177 | 168 | 159 | 169 | 161 | 152 | 143 | 153 | 145 | 136 | 127 | 137 | 129 |
| 180 |  | 188 | 181 | 189 | 164 | 172 | 165 | 173 | 148 | 156 | 149 | 157 | 132 | 140 | 133 | 141 |

|  | LEVEL 9 | | | | LEVEL 10 | | | | LEVEL 11 | | | | LEVEL 12 | | |
|---|---|---|---|---|---|---|---|---|---|---|---|---|---|---|---|
| 122 |  | 114 | 119 | 112 | 106 | 98 | 103 | 96 | 90 | 82 | 87 | 80 | 74 | 66 | 71 | 64 |
| 118 |  | 126 | 115 | 123 | 102 | 110 | 99 | 107 | 86 | 94 | 83 | 91 | 70 | 78 | 67 | 75 |
| 120 |  | 111 | 121 | 113 | 104 | 95 | 105 | 97 | 88 | 79 | 89 | 81 | 72 | 63 | 73 | 65 |
| 116 |  | 124 | 117 | 125 | 100 | 108 | 101 | 109 | 84 | 92 | 85 | 93 | 68 | 76 | 69 | 77 |

|  | LEVEL 13 | | | | LEVEL 14 | | | | LEVEL 15 | | | | LEVEL 16 | | |
|---|---|---|---|---|---|---|---|---|---|---|---|---|---|---|---|
| 58 |  | 50 | 55 | 48 | 42 | 34 | 39 | 32 | 26 | 18 | 23 | 16 |  |  |  |  |
| 54 |  | 62 | 51 | 59 | 38 | 46 | 35 | 43 | 22 | 30 | 19 | 27 |  |  |  |  |
| 56 |  | 47 | 57 | 49 | 40 | 31 | 41 | 33 | 24 | 15 | 25 | 17 |  |  |  |  |
| 52 |  | 60 | 53 | 61 | 36 | 44 | 37 | 45 | 20 | 28 | 21 | 29 |  |  |  |  |

| 6 | 11 | 16 | 2 |
| 9 | 3 | 7 | 14 |
| 13 | 1 | 5 | 10 |
| 8 | 15 | 12 | 4 |

| DOT LEVEL 1 | | | | DOT LEVEL 2 | | | | DOT LEVEL 3 | | | | DOT LEVEL 4 | | | |
|---|---|---|---|---|---|---|---|---|---|---|---|---|---|---|---|
| 8 | 13 | 9 | 6 | 24 | 29 | 25 | 22 | 40 | 45 | 41 | 38 | 56 | 61 | 57 | 54 |
| 15 | 1 | 3 | 11 | 31 | 17 | 19 | 27 | 47 | 33 | 35 | 43 | 63 | 49 | 51 | 59 |
| 12 | 5 | 7 | 16 | 28 | 21 | 23 | 32 | 44 | 37 | 39 | 48 | 60 | 53 | 55 | 64 |
| 4 | 10 | 14 | 2 | 20 | 26 | 30 | 18 | 36 | 42 | 46 | 34 | 52 | 58 | 62 | 50 |

| DOT LEVEL 5 | | | | DOT LEVEL 6 | | | | DOT LEVEL 7 | | | | DOT LEVEL 8 | | | |
|---|---|---|---|---|---|---|---|---|---|---|---|---|---|---|---|
| 72 | 77 | 73 | 70 | 88 | 93 | 89 | 86 | 104 | 109 | 105 | 102 | 120 | 125 | 121 | 118 |
| 79 | 65 | 67 | 75 | 95 | 81 | 83 | 91 | 111 | 97 | 99 | 107 | 127 | 113 | 115 | 123 |
| 76 | 69 | 71 | 80 | 92 | 85 | 87 | 96 | 108 | 101 | 103 | 112 | 124 | 117 | 119 | 128 |
| 68 | 74 | 78 | 66 | 84 | 90 | 94 | 82 | 100 | 106 | 110 | 98 | 116 | 122 | 126 | 114 |

| DOT LEVEL 9 | | | | DOT LEVEL 10 | | | | DOT LEVEL 11 | | | | DOT LEVEL 12 | | | |
|---|---|---|---|---|---|---|---|---|---|---|---|---|---|---|---|
| 136 | 141 | 137 | 134 | 152 | 157 | 153 | 150 | 168 | 173 | 169 | 166 | 184 | 189 | 185 | 182 |
| 143 | 129 | 131 | 139 | 159 | 145 | 147 | 155 | 175 | 161 | 163 | 171 | 191 | 177 | 179 | 187 |
| 140 | 133 | 135 | 144 | 156 | 149 | 151 | 160 | 172 | 165 | 167 | 176 | 188 | 181 | 183 | 192 |
| 132 | 138 | 142 | 130 | 148 | 154 | 158 | 146 | 164 | 170 | 174 | 162 | 180 | 186 | 190 | 178 |

| DOT LEVEL 13 | | | | DOT LEVEL 14 | | | | DOT LEVEL 15 | | | | DOT LEVEL 16 | | | |
|---|---|---|---|---|---|---|---|---|---|---|---|---|---|---|---|
| 200 | 205 | 201 | 198 | 216 | 221 | 217 | 214 | 232 | 237 | 233 | 230 | | | | |
| 207 | 193 | 195 | 203 | 223 | 209 | 211 | 219 | 239 | 225 | 227 | 235 | | | | |
| 204 | 197 | 199 | 208 | 220 | 213 | 215 | 224 | 236 | 229 | 231 | 240 | | | | |
| 196 | 202 | 206 | 194 | 212 | 218 | 222 | 210 | 228 | 234 | 238 | 226 | | | | |

FIG. 13

|  | LEVEL 1 | | | | LEVEL 2 | | | | LEVEL 3 | | | | LEVEL 4 | | |
|---|---|---|---|---|---|---|---|---|---|---|---|---|---|---|---|
| 247 | 242 | 246 | 249 | 231 | 226 | 230 | 233 | 215 | 210 | 214 | 217 | 199 | 194 | 198 | 201 |
| 240 | 254 | 252 | 244 | 224 | 238 | 236 | 228 | 208 | 222 | 220 | 212 | 192 | 206 | 204 | 196 |
| 243 | 250 | 248 | 239 | 227 | 234 | 232 | 223 | 211 | 218 | 216 | 207 | 195 | 202 | 200 | 196 |
| 251 | 245 | 241 | 253 | 235 | 229 | 225 | 237 | 219 | 213 | 209 | 221 | 203 | 197 | 193 | 205 |

|  | LEVEL 5 | | | | LEVEL 6 | | | | LEVEL 7 | | | | LEVEL 8 | | |
|---|---|---|---|---|---|---|---|---|---|---|---|---|---|---|---|
| 183 | 178 | 182 | 185 | 167 | 162 | 166 | 169 | 151 | 146 | 150 | 153 | 135 | 130 | 134 | 137 |
| 176 | 190 | 188 | 180 | 160 | 174 | 172 | 164 | 144 | 158 | 156 | 148 | 128 | 142 | 140 | 132 |
| 179 | 186 | 184 | 175 | 163 | 170 | 168 | 159 | 147 | 154 | 152 | 143 | 131 | 138 | 136 | 127 |
| 187 | 181 | 177 | 189 | 171 | 165 | 161 | 173 | 155 | 149 | 145 | 157 | 139 | 133 | 129 | 141 |

|  | LEVEL 9 | | | | LEVEL 10 | | | | LEVEL 11 | | | | LEVEL 12 | | |
|---|---|---|---|---|---|---|---|---|---|---|---|---|---|---|---|
| 119 | 114 | 118 | 121 | 103 | 98 | 102 | 105 | 87 | 82 | 86 | 89 | 71 | 66 | 70 | 73 |
| 112 | 126 | 124 | 116 | 96 | 110 | 108 | 100 | 80 | 94 | 92 | 84 | 64 | 78 | 76 | 68 |
| 115 | 122 | 120 | 111 | 99 | 106 | 104 | 95 | 83 | 90 | 88 | 79 | 67 | 74 | 72 | 63 |
| 123 | 117 | 113 | 125 | 107 | 101 | 97 | 109 | 91 | 85 | 81 | 93 | 75 | 69 | 65 | 77 |

|  | LEVEL 13 | | | | LEVEL 14 | | | | LEVEL 15 | | | | LEVEL 16 | | |
|---|---|---|---|---|---|---|---|---|---|---|---|---|---|---|---|
| 55 | 50 | 54 | 57 | 39 | 34 | 38 | 41 | 23 | 18 | 22 | 25 | | | | |
| 48 | 62 | 60 | 52 | 32 | 46 | 44 | 36 | 16 | 30 | 28 | 20 | | | | |
| 51 | 58 | 56 | 47 | 35 | 42 | 40 | 31 | 19 | 26 | 24 | 15 | | | | |
| 59 | 53 | 49 | 61 | 43 | 37 | 33 | 45 | 27 | 21 | 17 | 29 | | | | |

FIG. 14

MULTI-BIT RENDERING METHOD AND ARRANGEMENT FOR CONTINUOUS TONE PICTURE REPRESENTATION AND PRINTING

This invention is related to the following applications, filed on even date with the present application: U.S. Ser. No. 07/894,858, for Classification to Change Exposure Within a Cell of Different Pixels; Ser. No. 07/894,857, for Halftone Dot Arrangement in Gray Level Halftone Printing; U.S. Ser. No. 07/894,859, for A Method and Arrangement For Providing a Default Mode in Digital Copying; U.S. Ser. No. 07/895,555, for A Method and Arrangement For Locally Switching Gray Dot Types to Reproduce an Image With Gray Level Printing; U.S. Ser. No. 07/895,986, for An Image Processing Method to Remove Halftone Screens; U.S. Ser. No. 07/895,554, for A Method and Apparatus For Imbedding Controlled Structure For Gray Scale Rendering; and U.S. Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to a multi-bit rendering method and arrangement for providing continuous tone picture representation.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

As indicated earlier, continuous-tone pictures can only be printed in binary form through a halftoning process. The halftone process breaks the picture into dots via a screen-like structure. Through the integration of the human visual system, a sensation of gray shades is achieved. Normally, increasing the dot resolutions (for example, 2000 dots per inch (dpi)–3000 dpi or higher) and making the dots smaller are the way to produce a high quality picture (a continuous-tone like picture). However, it is not necessary to present the continuous tone photographic quality picture in such high image resolutions. For example, 400 dpi or 500 dpi printing resolutions with 8-bit to 12-bit gray scales are adequate for true continuous tone photographic quality printing. Such continuous tone printing systems (for example, the photographic film based process and the dye sublimation thermal based process) are on the market now. These are very expensive exposure system controls which deliver 8-bit to 12-bit gray scales. Those printing devices and exposure system controls currently use two designs: a current modulating laser intensity system or a time modulating laser exposure system.

Through human visual system study, it has been discovered that the human eye can't distinguish the shade changes (i.e. it looks like a continuous shade) at medium resolutions around 400 dpi–600 dpi range with multi-bit (4 bits or 5 bits) image pixel information.

There is a need for a design of dot patterns and the rendering of images into 4 bits or 5 bits image representation, such that when the rendered images are reconstructed through the gray scale printing, the restored structure looks like a continuous tone picture.

SUMMARY OF THE INVENTION

This and other needs are met by the present invention which provides a method of reproducing an original image, comprising scanning and digitizing an original image into pixels of a digitized image, selecting a dot template, a bit-depth, and a dot type structure. A set of gray dot patterns are generated from the dot template, pixel bit-depth and dot type structure that are selected. A 4-quadrant tone reproduction on the set of gray dot patterns is then performed to produce a set of thresholding values at each pixel of the digitized image. A first signal corresponding to a gray level halftoned representation of the digitized image using the thresholding values is then produced. From the first signal, a gray level halftoned reproduction of the original image is printed.

The earlier stated needs are also met by the present invention which provides an arrangement for reproducing an original image, comprising a scanner which scans and digitizes the original image into pixels, a controller coupled to the scanner to receive the digitized original image, and which produces a first signal corresponding to a gray level halftoned representation of the digitized original image, and a printer coupled to the controller to receive the first signal and which produces a gray level halftoned reproduction of the original image. The controller includes means for obtaining a set of thresholding values at each pixel from a specified set of gray dot patterns by 4-quadrant tone reproduction.

From the data packing point of view, the approach of the present invention has reduced the bit-depth from 8 bits to 4 bits, so that a compression is achieved. This rendition goal, however, is not the same as that of data compression. In data compression, it is mainly for storage/transmission purposes which later expand the compressed image to the original image form without visual loss of information. The result of data packing in the multi-bit rendering of the present invention benefits the throughput of the system and the bandwidth of the data transfer.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary 3-bit gray halftone dot layout according to a full dot type embodiment of the present invention.

FIG. 6 shows a 3-bit gray halftone dot layout according to a partial dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

FIG. 9 shows a Bayer dispersion dot template.

FIG. 10 illustrates a 4-bit partial dot pattern set using the dot template of FIG. 9.

FIG. 11 shows a threshold pattern for gray scale rendering using the dot template of FIG. 9 and the dot pattern set of FIG. 10.

FIG. 12 shows a cluster dot template.

FIG. 13 illustrates a 4-bit partial dot pattern set using the dot template of FIG. 12.

FIG. 14 shows a threshold pattern for gray scale rendering using the dot template of FIG. 12 and the dot pattern set of FIG. 13.

DETAILED DESCRIPTION OF THE DRAWINGS

Figures 1, 2:
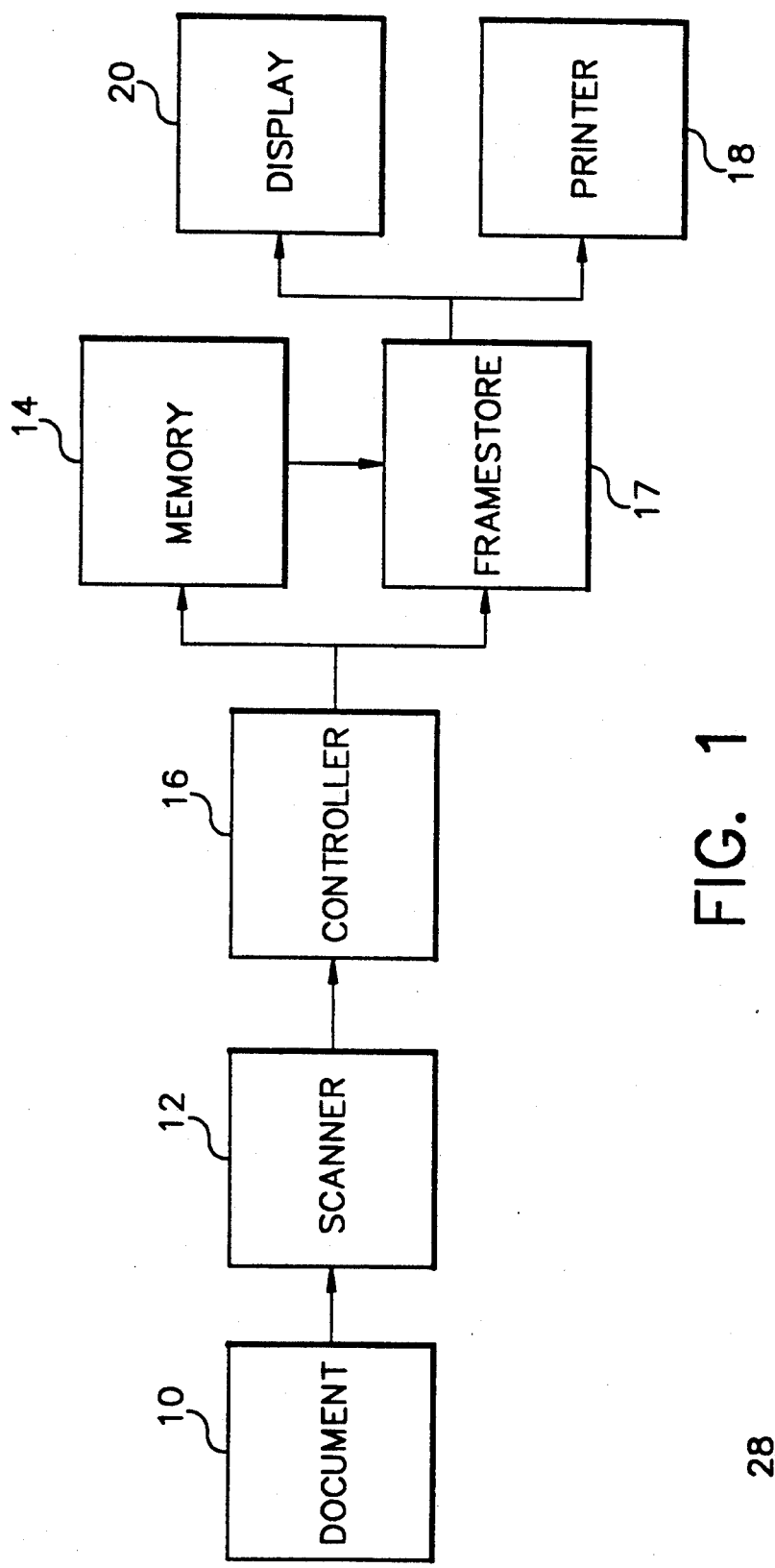
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a superpixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

Figures 4, 5:
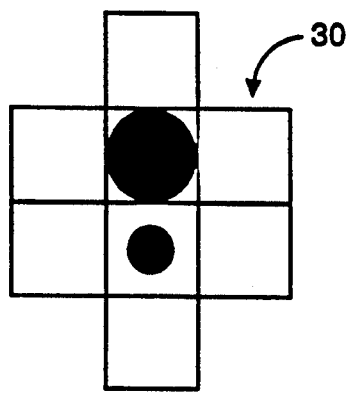
FIG. 4 shows a cell with dots that have been formed.
FIG. 5 illustrates an exemplary halftone dot mask.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

The present invention extends the dispersion dot type which is often used in binary halftone rendering to a multi-bit dot pattern. For gray scale printing, the gray scale dot designs "full", "partial", and "mixed" dot types have been defined above. Each dot type has its own tonal characteristics and texture patterns. With the proper choice of dot template (i.e., the optimal Bayer dot pattern or the cluster dot pattern), pixel bit-depth (i.e., 4-bit or 5-bit per pixel), and the "partial" dot type structure, a set of gray dot patterns is generated that will create a continuous tone look image.

Figure 9:
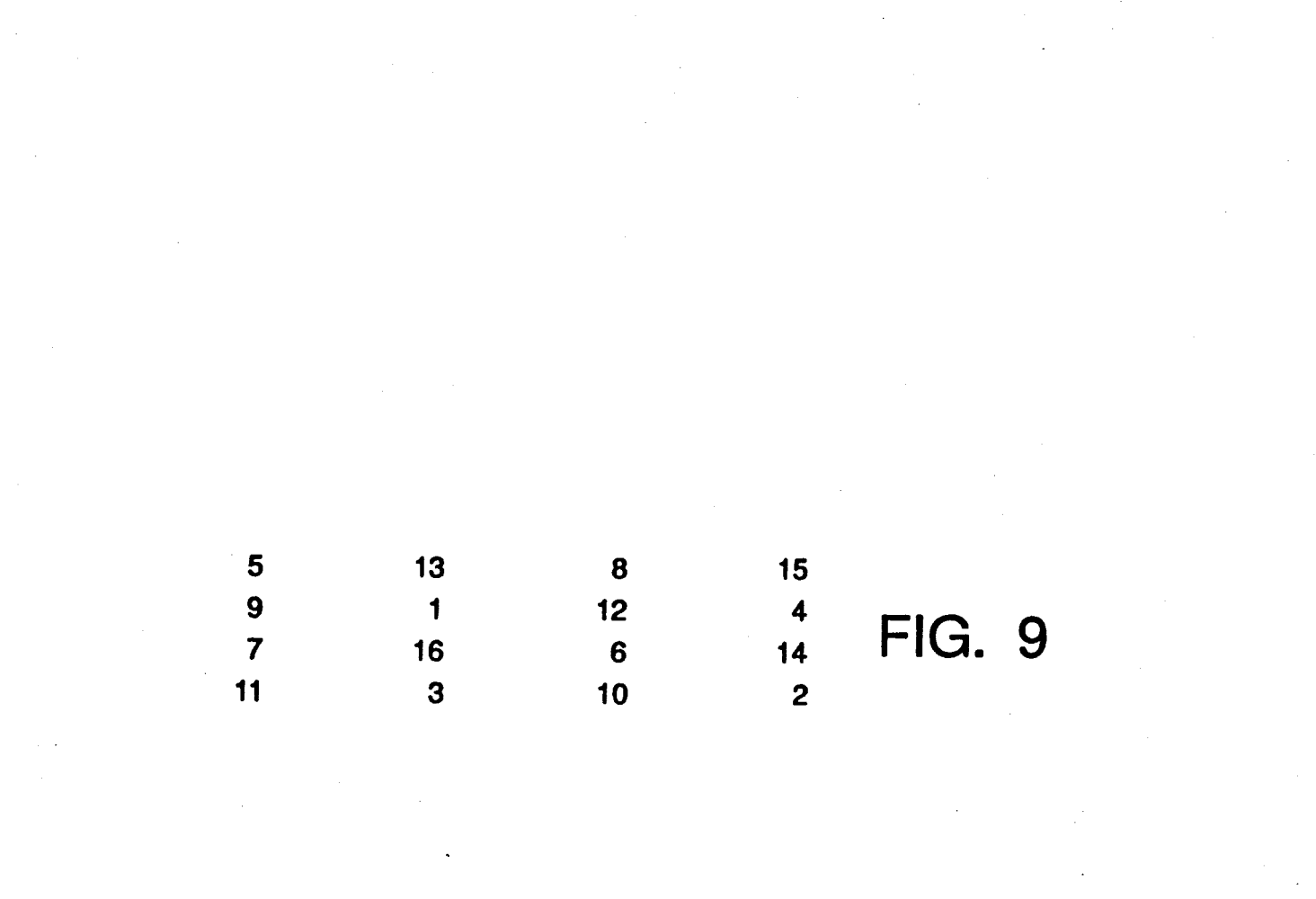
Figure 12:
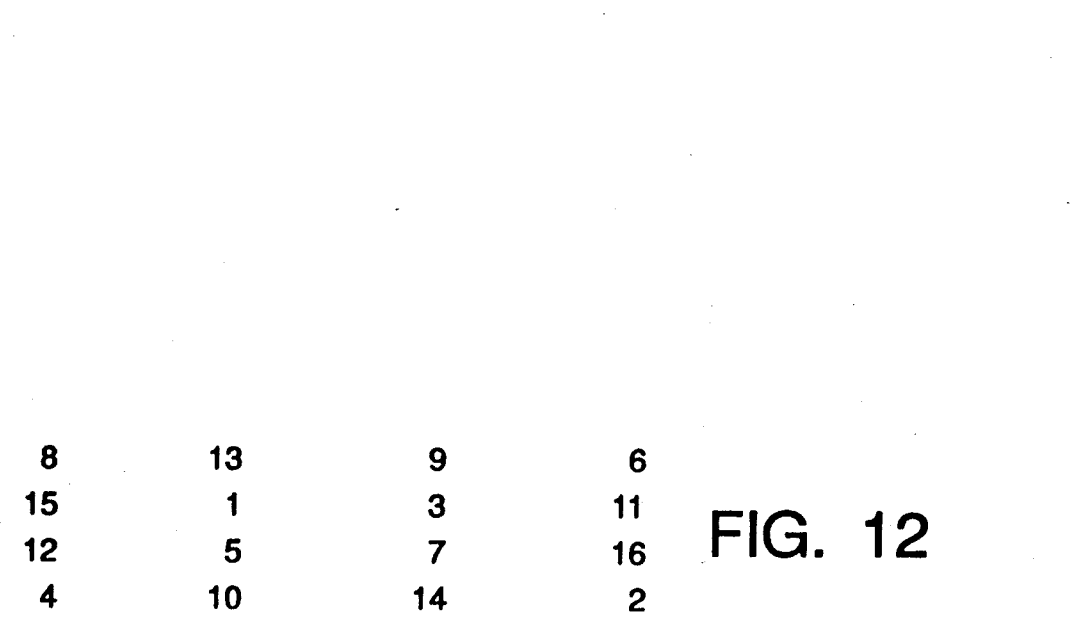

For example, a Bayer dispersion dot template is illustrated in FIG. 9, and the 4-bit partial dot pattern set gray dot pattern in FIG. 10. The thresholding pattern for gray scale rendering obtained from the patterns of FIG. 10 by the 4-quadrant tone reproduction process are illustrated in FIG. 11. As another example, a cluster dot pattern dot template is illustrated in FIG. 12, and the 4-bit partial dot pattern set gray dot pattern in FIG. 13. The thresholding pattern for gray scale rendering obtained from the patterns of FIG. 13 by the 4-quadrant tone reproduction process are illustrated in FIG. 14.

Figure 15:
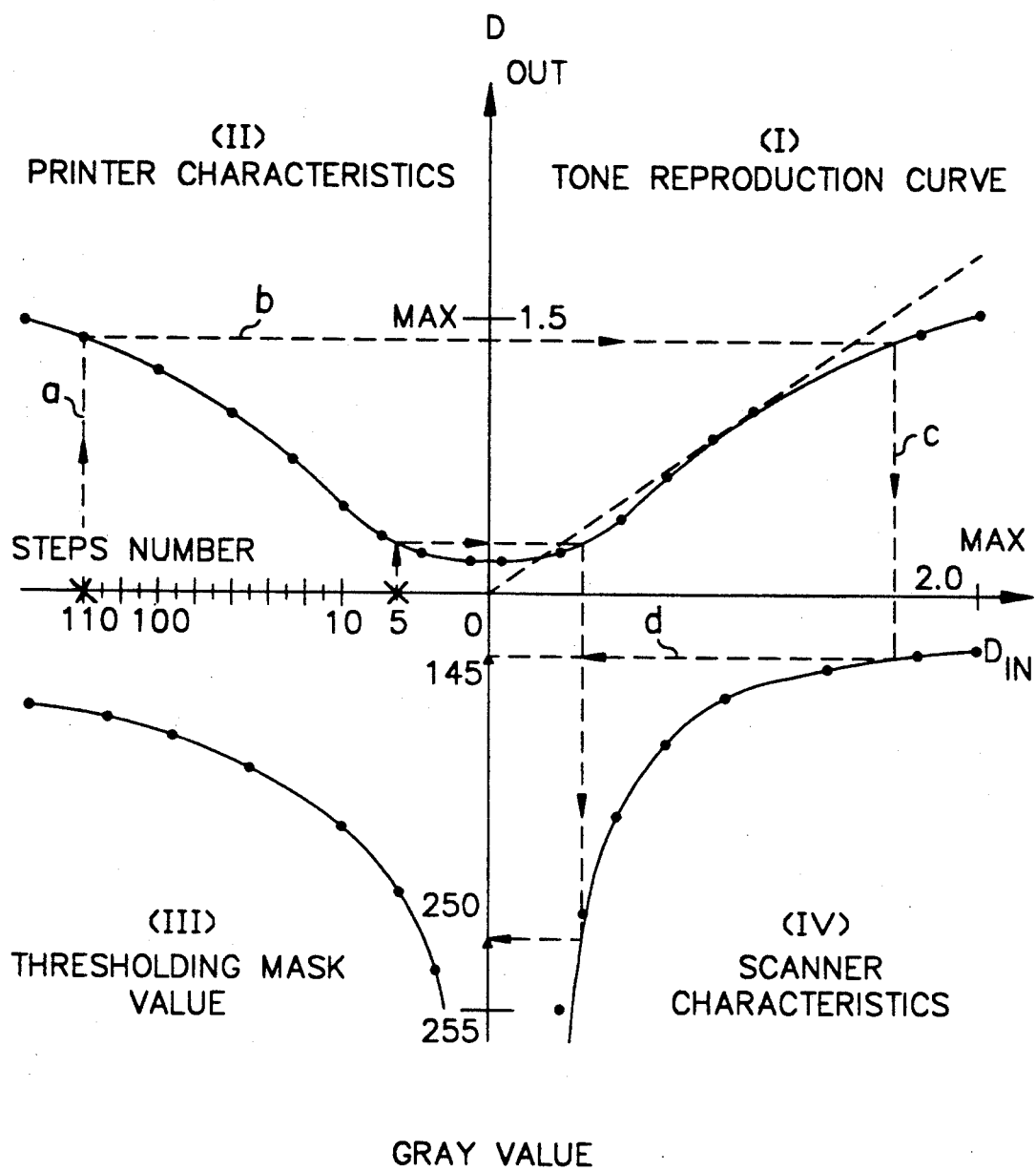
FIG. 15 shows a tone reproduction control chart.

The generation of the threshold mask patterns of FIGS. 11 and 14 will be described. These thresholding mask are derived from the dot layout, such as shown in FIGS. 10 and 13, using a tone reproduction control chart, such as shown in FIG. 15. The tone reproduction chart has four quadrants. The first quadrant (I) contains the input and output density of a specific tone reproduction curve, which specifies the gamma or the contrast of the image to be reproduced. The second quadrant (II) captures the characteristics of the gray level printing process. The fourth quadrant (IV) preserves the characteristics of the scanner, which converts the density to a gray value. The third quadrant (III) maps gray values into gray steps linking the quadrants IV, I and II together.

To determine a thresholding mask value using this chart, the step number of the dot sequence in the dot layout of a cell is replaced by a gray value. For example, for step number 110 (found in dot level 7 of FIG. 10 for the Bayer dot pattern) the mapping along arrows a, b, c, and d provides the gray value of 145. Similarly, for step number 5, the gray value maps to 250. (The values of the step number and the gray values are inversely related). In this manner, the thresholding masks of FIGS. 11 and 14 are derived.

The thresholding mask is used to determine what the gray level of an output pixel should be given corresponding to its input pixel gray value. Assume, for example, that the input image pixel at location (1,1) of the 4×4 matrix cell of FIG. 11 has a gray value of 125. The 15 thresholding values at the (1,1) location of the 4×4 cell are:

250, 234, 218, 202, 186, 170, 154, 138, 122, 106, 90, 74, 58, 42, and 26.

Since the input image pixel has a gray value of 125, which is between the two threshold values 138 and 122, the output gray level 8 is given to that pixel.

A digital halftoning process (or "gray scale rendering process") converts the image into a multi-bit image representation with the thresholding values of either FIG. 11 or FIG. 14, depending on which dot template is used. This multi-bit image has a continuous-tone-look structure with a weak dot screen imbedded in it. A continuous-tone-look image is then reconstructed from the multi-bit rendered image through a gray scale printer. These constructed images have no visual screen structure. Hence a continuous tone picture printing is achieved through the multi-bit image rendition method.

Figure 16:
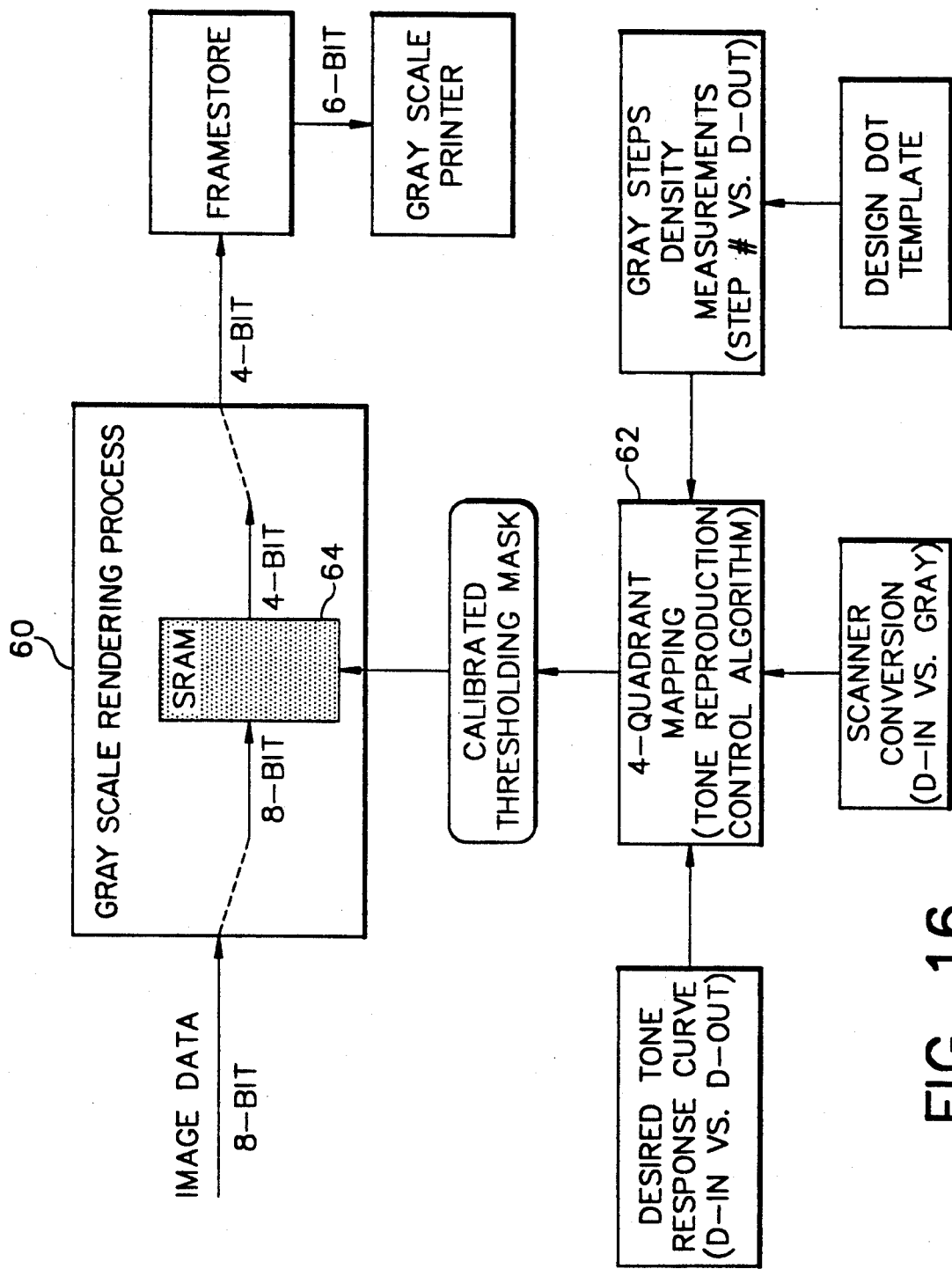
FIG. 16 is a basic block diagram of the process of the present invention.

A simplified block diagram illustrating the gray scale rendering process of the present invention is provided in FIG. 16. Eight-bit image data is input to the digital halftone process block 60, which also receives signals relating to the calibrated thresholding mask that has been created as in FIGS. 11 and 14. The tone reproduction block 62 performs the 4-quadrant mapping illustrated in FIG. 15 to produce threshold masks from the dot layouts. The tone reproduction block receives as inputs the desired tone response curve, the gray steps density measurements, and the scanner conversion, and generates a mapping from step number of a dot layout to a gray code value output of the calibrated thresholding mask.

The digital halftoning process block 60 converts the input pixel value into output exposure levels through the thresholding value setting at each pixel location in the cell. This can be implemented by a SRAM 64 lookup table that receives the thresholding mask. An image with a reduced bit-depth of four bits is the output of the digital halftoning process block 60. This 4-bit image is provided to a framestore and can then be printed by a 6-bit gray scale printer. (Other information, such as 2-bit pixel classification information, can be added to the 4-bit image data from the framestore.)

With the above described process, an image that looks like a continuous tone picture is provided using a reduced (4-bits) image representation and gray scale printing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for reproducing an original image, comprising:
    a scanner which scans and digitizes the original image into pixels;
    a controller coupled to the scanner to receive the digitized original image, and which produces a first signal corresponding to a gray level halftoned representation of the digitized original image; and
    a printer coupled to the controller to receive said first signal and which produces a gray level halftoned reproduction of the original image;
    wherein the controller includes means for obtaining a set of thresholding values at each pixel from a specified set of gray dot patterns by 4-quadrant tone reproduction.

2. The arrangement of claim 1, wherein the controller includes means for generating said gray dot patterns that are dependent on a dot template, pixel bit-depth, and partial dot type structure.

3. The arrangement of claim 2, wherein the dot template is an optimal Bayer dot pattern.

4. The arrangement of claim 2, wherein the dot template is a cluster dot pattern.

5. The arrangement of claim 2, wherein the pixel bit-depth is 4 bits.

6. The arrangement of claim 2, wherein the pixel bit-depth is 5 bits.

7. A method of reproducing an original image, comprising:
    scanning and digitizing an original image into pixels of a digitized image;
    selecting a dot template;
    selecting a bit-depth;
    selecting a dot type structure;
    generating a set of gray dot patterns from the dot template, pixel bit-depth and dot type structure selected;
    performing 4-quadrant tone reproducing on the set of gray dot patterns to produce a set of thresholding values at each pixel of the digitized image;
    producing a first signal corresponding to a gray level halftoned representation of the digitized image using the thresholding values; and
    printing from the first signal a gray level halftoned reproduction of the original image.

8. The method of claim 7, wherein the dot template is one of a Bayer dot pattern or a cluster dot pattern.

9. The method of claim 7, wherein the pixel bit-depth if one of 4 bits or 5 bits.

10. The method of claim 7, wherein the dot type structure is a partial dot type structure.

* * * * *